(12) United States Patent
Khowaiter et al.

(10) Patent No.: US 12,371,335 B2
(45) Date of Patent: Jul. 29, 2025

(54) AMMONIA PRODUCTION FROM CARBON-AND WATER-DERIVED HYDROGEN

(71) Applicant: Saudi Arabian Oil Company, Dhahran (SA)

(72) Inventors: Ahmad O. Khowaiter, Dhahran (SA); Mourad Younes, Dhahran (SA); Aqil Jamal, Dhahran (SA); Gerard De Nazelle, Dhahran (SA); Aadesh Harale, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 883 days.

(21) Appl. No.: 17/550,857

(22) Filed: Dec. 14, 2021

(65) Prior Publication Data
US 2023/0183083 A1  Jun. 15, 2023

(51) Int. Cl.
*C01C 1/04* (2006.01)
*C01B 3/02* (2006.01)
*C25B 1/04* (2021.01)

(52) U.S. Cl.
CPC ............ *C01C 1/0488* (2013.01); *C01B 3/025* (2013.01); *C25B 1/04* (2013.01);
(Continued)

(58) Field of Classification Search
CPC ............ C01B 3/025; C01B 2203/0205; C01B 2203/0283; C01B 2203/068; C01B 3/382;
(Continued)

(56) References Cited

U.S. PATENT DOCUMENTS 5,714,132 A * 2/1998 Kapoor .................. F25J 3/0223
423/655
7,772,450 B2   8/2010 Iaccino et al.
(Continued)

FOREIGN PATENT DOCUMENTS

CN    103586030 A    2/2014
CN    104258864 A    1/2015
(Continued)

OTHER PUBLICATIONS

International Search Report and Written Opinion in International Appln. No. PCT/US2022/052654, mailed on Jan. 22, 2024, 13 pages.
(Continued)

*Primary Examiner* — Anthony J Zimmer
*Assistant Examiner* — Abdul-Rahman Yusuf Waleed Smari
(74) *Attorney, Agent, or Firm* — Fish & Richardson P.C.

(57) ABSTRACT

Methods and systems for ammonia production are provided. An exemplary method includes electrolyzing water to form $H_2$ and $O_2$; contacting a reformer feed stream including hydrocarbons, $O_2$ from electrolysis, and an oxidant stream including $O_2$ and $N_2$ to form a reformed stream including $H_2$, CO, $CO_2$, and $N_2$; contacting the reformed stream with a water-gas shift catalyst to form a shifted stream including $H_2$, $CO_2$, and $N_2$; separating the shifted stream to form a captured stream including $CO_2$ and an ammonia production feed stream including $H_2$ and $N_2$; and reacting the ammonia production feed stream, and optionally $H_2$ from electrolysis, to form ammonia.

1 Claim, 5 Drawing Sheets

(52) U.S. Cl.
CPC ............... *C01B 2203/0205* (2013.01); *C01B 2203/0283* (2013.01); *C01B 2203/068* (2013.01)

(58) Field of Classification Search
CPC .......... C01B 3/48; C25B 1/04; C25B 15/081; C01C 1/0405; C01C 1/0488; Y02E 60/36
See application file for complete search history.

(56) References Cited

U.S. PATENT DOCUMENTS

| | | | |
|---|---|---|---|
| 8,586,500 | B2 | 11/2013 | Kuperman et al. |
| 8,628,744 | B2 * | 1/2014 | Flytzani-Stephanopoulos ............ B01J 37/035 423/247 |
| 11,110,434 | B2 | 9/2021 | Jiang et al. |
| 11,478,784 | B2 | 10/2022 | Gascon et al. |
| 2001/0006615 | A1 | 7/2001 | Badano |
| 2012/0100062 | A1 | 4/2012 | Nakamura et al. |
| 2013/0108538 | A1 * | 5/2013 | Ostuni ................. C01C 1/0476 422/148 |
| 2016/0149244 | A1 * | 5/2016 | Abe ......................... C01B 3/32 422/111 |
| 2018/0215618 | A1 * | 8/2018 | Kang ....................... C01B 3/48 |
| 2019/0308183 | A1 | 10/2019 | Agblevor et al. |
| 2020/0016578 | A1 * | 1/2020 | Mikhajlov ............. B01J 37/088 |
| 2020/0172394 | A1 | 6/2020 | Han et al. |
| 2022/0119720 | A1 * | 4/2022 | Bielenberg ............... C10K 3/04 |
| 2022/0401915 | A1 | 12/2022 | Koh et al. |
| 2023/0041936 | A1 | 2/2023 | Cho et al. |
| 2023/0092115 | A1 | 3/2023 | Han et al. |
| 2023/0234841 | A1 | 7/2023 | Chae et al. |
| 2024/0050933 | A1 | 2/2024 | Yavuz |

FOREIGN PATENT DOCUMENTS

| | | | |
|---|---|---|---|
| CN | 105561998 A | 5/2016 | |
| CN | 113562701 | 10/2021 | |
| DE | 202010012734 U1 * | 1/2012 | ............... C10L 3/08 |
| EP | 3988205 A1 | 4/2022 | |
| GB | 2573885 | 11/2019 | |
| KR | 1020180043936 A | 5/2018 | |
| WO | WO 2016069385 A1 | 5/2016 | |
| WO | WO 2018026246 A1 | 2/2018 | |
| WO | WO 2019020376 | 1/2019 | |
| WO | WO-2019043875 A1 * | 3/2019 | |
| WO | WO 2021122584 | 6/2021 | |

OTHER PUBLICATIONS

Berenschot, "Oxygen synergy for hydrogen production" TESN118016—Waterstofversneller, Dec. 2019, 97 pages.

Esposito, "Membraneless electrolyzers for low-cost hydrogen production in a renewable energy future" Joule 1.4, Dec. 2017, 651-658, 8 pages.

Zhang et al., "Techno-economic comparison of green ammonia production processes" Applied Energy 259, Feb. 2020, 12 pages.

Huang et al., "Hydrogen generation by ammonia decomposition over Co/CeO2 catalyst: Influence of support morphologies," Applied Surface Science, 2020, 532: 147335, 16 pages.

Huo et al., "Spatial confinement and electron transfer moderating MoN bond strength for superior ammonia decomposition catalysis," Applied Catalysis B: Environmental, 2021, 294:120254, 12 pages.

Jafarbegloo et al., "One-pot synthesis of NiO—MgO nanocatalysts for CO2 reforming of methane: The influence of active metal content on catalytic performance," Journal of Natural Gas Science and Engineering, 2015, 27:1165-1173, 23 pages.

Kawi et al., "Progress in synthesis of highly active and stable nickel-based catalysts for carbon dioxide reforming methane," Chemsuschem, 2015, 8(21):3556-3575, 20 pages.

Krishnan et al., "COx-free hydrogen generation via decomposition of ammonia over al, Ti and Zr—Laponite supported MoS2 catalysts," International Journal of Hydrogen Energy, 2020, 45(15):8568-8583, 16 pages.

Li et al., "Highly efficient Co/NC catalyst derived from ZIF-67 for hydrogen generation through ammonia decomposition," International Journal of Hydrogen Energy, Mar. 2022, 47(26):12882-12892, 11 pages.

Li et al., "Production of hydrogen by ammonia decomposition over supported Co3O4 catalysts," Catalysis Today, Sep. 2022, 402:45-51, 7 pages.

Lucentini et al., "Ammonia decomposition over 3D-printed CeO2 structures loaded with Ni," Applied Catalysis A: General, 2020, 591: 117382, 31 pages.

Maleki et al., "Co—Ce—Al—O mesoporous catalysts for hydrogen generation via ammonia decomposition," International Journal of Hydrogen Energy, 2024, 51:267-275, 9 pages.

Pakhare et al., "A review of dry CO2 reforming of methane over noble metal catalysts," Chem Soc Rev, 2014, 43(22):7813-7837, 25 pages.

Parker et al., "Ammonia Decomposition Enhancement by Cs-Promoted Fe/A12O3 Catalysts," Catalysis Letters, 2020, 150(12):3369-3376, 8 pages.

Pinzón et al., "COx-free hydrogen production from ammonia at low temperature using Co/SiC catalyst: Effect of promoter," Catalysis Today, May 2022, 390-391:34-47, 14 pages.

Song et al., "Dry reforming of methane by stable Ni—Mo nanocatalysts on single crystalline MgO," Catalysis, Science, Feb. 2020, 367:777-781, 6 pages.

Su et al., "Fe-based catalyst derived from MgFe-LDH: Very efficient yet simply obtainable for hydrogen production via ammonia decomposition," International Journal of Hydrogen Energy, 2021, 46(61):31122-31132, 11 pages.

Wolfbeisser et al., "Methane dry reforming over ceria-zirconia supported Ni catalysts," Catal Today, 2016, 277:234-245, 12 pages.

Xie et al., "Immobilizing Ni nanoparticles to mesoporous silica with size and location control via a polyol-assisted route for coking and sintering resistant dry reforming of methane," Chem Commun, 2014, 50(55):7250-7253, 4 pages.

Zhang et al., "Coke-resistant Ni@SiO2 catalyst for dry reforming of methane," Applied Catalysis B-Environmental, 2015, 176:513-521, 9 pages.

* cited by examiner

100

AMMONIA PRODUCTION FROM CARBON-AND WATER-DERIVED HYDROGEN

TECHNICAL FIELD

The present disclosure is directed to producing ammonia from hydrogen derived from carbon-containing fuels and water electrolysis.

BACKGROUND

Hydrogen can be produced with "low carbon" using advanced methods such as water electrolysis, for example driven by renewable power, and from carbon-containing fuels in combination with carbon capture, utilization and storage (CCUS). Accordingly, hydrogen has the potential to make a significant contribution to a cleaner, more secure, and affordable energy future. In order to transport hydrogen over long distances at large-scale, it can be converted to ammonia, which can then be easily shipped in liquid form at moderate temperature and pressure conditions.

However, existing ammonia production processes involving carbon- or water-based hydrogen production technologies can have limited reliability, efficiency, or both. Thus, there remains a need for improved ammonia production processes.

SUMMARY

An embodiment described herein provides a method for producing ammonia. The method includes electrolyzing water to form a first electrolysis stream including $H_2$ and a second electrolysis stream including $O_2$. A reformer feed stream including hydrocarbons, at least a portion of the second electrolysis stream including $O_2$, and an oxidant stream including $O_2$ and $N_2$ are contacted under conditions suitable to form a reformed stream including $H_2$, CO, $CO_2$, and $N_2$. At least a portion of the reformed stream is contacted with a water-gas shift catalyst under conditions suitable to form a shifted stream including $H_2$, $CO_2$, and $N_2$, and at least a portion of the shifted stream is separated to form a captured stream including $CO_2$ and an ammonia production feed stream including $H_2$ and $N_2$. The method includes reacting an ammonia production mixture including at least a portion of the ammonia production feed stream including $H_2$ and $N_2$, and optionally at least a portion of the first electrolysis stream including $H_2$, to form a product stream including ammonia.

An embodiment described herein provides a system for producing ammonia. The system includes an electrolyzer configured to electrolyze water to form a first electrolysis stream including $H_2$ and a second electrolysis stream including $O_2$, and a reformer configured to contact a reformer feed stream including hydrocarbons, at least a portion of the second electrolysis stream including $O_2$, and an oxidant stream including $O_2$ and $N_2$ under conditions suitable to form a reformed stream including $H_2$, CO, $CO_2$, and $N_2$. The system includes a water-gas shift reactor configured to contact at least a portion of the reformed stream with a water-gas shift catalyst under conditions suitable to form a shifted stream including $H_2$, $CO_2$, and $N_2$, and a carbon capture unit configured to separate at least a portion of the shifted stream to form a captured stream including $CO_2$ and an ammonia production feed stream including $H_2$ and $N_2$. The system includes an ammonia production unit configured to react at least a portion of the ammonia production feed stream including $H_2$ and $N_2$, and optionally at least a portion of the first electrolysis stream including $H_2$, to form a product stream including ammonia.

An embodiment described herein provides a method for producing ammonia using a system including an electrolyzer configured to electrolyze water to form a first electrolysis stream including $H_2$ and a second electrolysis stream including $O_2$, a reformer configured to contact a reformer feed stream including hydrocarbons, at least a portion of the second electrolysis stream including $O_2$, and an oxidant stream including $O_2$ and $N_2$ under conditions suitable to form a reformed stream including $H_2$, CO, $CO_2$, and $N_2$, a water-gas shift reactor configured to contact at least a portion of the reformed stream with a water-gas shift catalyst under conditions suitable to form a shifted stream including $H_2$, $CO_2$, and $N_2$, a carbon capture unit configured to separate at least a portion of the shifted stream to form a captured stream including $CO_2$ and an ammonia production feed stream including $H_2$ and $N_2$, an ammonia production unit configured to react at least a portion of the ammonia production feed stream including $H_2$ and $N_2$, and optionally at least a portion of the first electrolysis stream including $H_2$, to form a product stream including ammonia, an $O_2$ liquefaction unit configured to liquefy at least a portion of the second electrolysis stream including $O_2$ to form liquid $O_2$, an $O_2$ storage facility configured to store the liquid $O_2$, and an $O_2$ gasification unit configured to gasify at least a portion of the liquid $O_2$ and provide the gasified $O_2$ to the reformer. The method includes detecting a decreased amount of the first electrolysis stream formed by the electrolyzer, and then increasing an amount of the reformer feed stream contacted in the reformer, relative to an amount of the oxidant stream contacted in the reformer, and increasing an amount of the gasified $O_2$ contacted in the reformer, relative to an amount of the oxidant stream contacted in the reformer. After increasing the amount of the contacted reformer feed stream and the contacted gasified $O_2$, a molar ratio of a total amount of $H_2$ present in the first electrolysis stream and $H_2$ present in the shifted stream to a total amount of $N_2$ present in the reformed stream is at least about 2.5, and a rate of formation of the product stream is at least 50% of a maximum rate of formation of the product stream corresponding to a maximum rate of formation of the first electrolysis stream.

DETAILED DESCRIPTION

Figure 1:
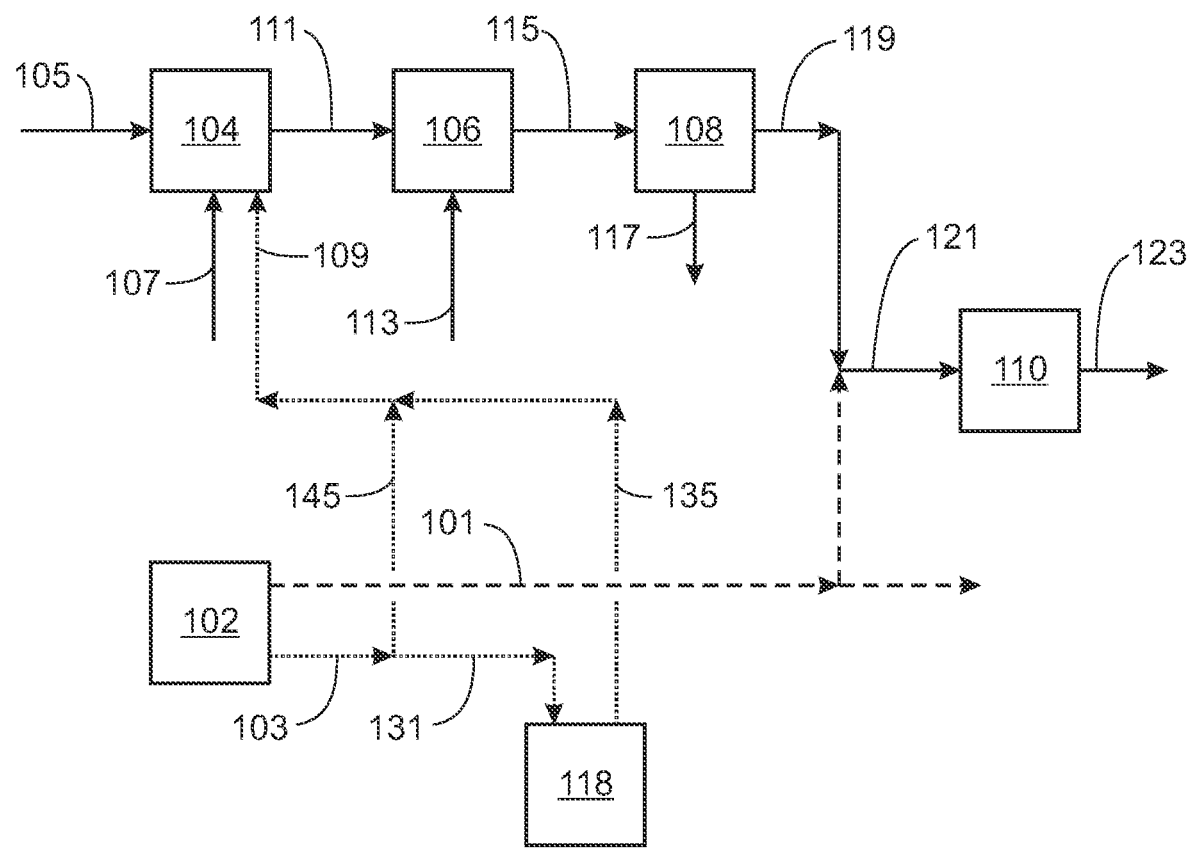
FIG. 1 is a schematic diagram of a system for producing ammonia.

The present disclosure relates to methods and systems for ammonia production including carbon- and water-based $H_2$ production. In particular, the operational methods and systems of the present disclosure can reliably and efficiently synthesize ammonia from a mixture of $N_2$ and $H_2$ using integrated hydrocarbon reformation and water electrolysis processes, even in cases where water electrolysis, for example, driven by solar or wind power, is discontinuous.

The methods and systems of the present disclosure can further include an integrated oxy-combustion power plant, for example, to provide "low carbon" power to the integrated methods and systems.

Existing hydrogen production processes involving water-based $H_2$ production technologies can have limited capacity, effectiveness, or both, for example in view of the intermittent nature of most renewable power and the high costs of energy storage. Thus, improved operation of $H_2$ production processes, particularly water-based production processes, is being pursued to target continuous production of $H_2$, and subsequently $H_2$ carriers such as ammonia.

Synergies in co-production of $H_2$ from water-based and carbon-based sources, where the $O_2$ needed to drive autothermal or partial oxidation of a carbonaceous fuel includes by-product $O_2$ generated during water electrolysis, are known. However, such synergies alone have limited applicability to production of hydrogen carriers such as ammonia.

The present disclosure identifies synergies in the co-production of $H_2$ from water and carbon-based sources for ammonia production, which additionally requires an $N_2$ feed. The present disclosure describes an operational system integrating water-based $H_2$ production, carbon-based $H_2$ production, and ammonia production, which system can have a maximum utilization factor, can provide a continuous ammonia supply, and can reduce ammonia production costs.

The systems of the present disclosure can utilize $N_2$ from air for ammonia production and the corresponding $O_2$ from air, along with by-product $O_2$ from a water-based $H_2$ production process, for reforming a carbonaceous feed in the production process, while utilizing co-produced water-based $H_2$ and carbon-based $H_2$ for ammonia production. In one example, part or all of the $N_2$ necessary for ammonia production from the water-based and carbon-based $H_2$ can be supplied via the carbon-based $H_2$ stream from the carbon-based $H_2$ production process. The carbon-based $H_2$ production process can be operated to provide a total $H_2$ (water-based and carbon-based) to $N_2$ ratio within an operational range of the ammonia production process, typically a ratio of about 3. In some such configurations, by-product oxygen from the electrolyzers can be stored, partially or totally, for later use.

In instances where water-based $H_2$ production is decreased, for example, because of intermittent renewable power, the load on the ammonia plant can be reduced, and the plant could reach off-design operating conditions. As described in the present disclosure, to increase $H_2$ production to a rate necessary to maintain the ammonia plant in an operable range, carbon-based $H_2$ production can be increased to produce more $H_2$ while maintaining the total $H_2$-to-$N_2$ ratio within a design specification of the ammonia plant. In some examples of the present systems and methods, this can be achieved by increasing an amount of hydrocarbon feedstock provided to the reformer of the carbon-based $H_2$ production process, and operating the reformer in an $O_2$-enriched mode where the additional feedstock is reformed using an $O_2$ stream free from $N_2$. The $N_2$-free $O_2$ stream can include $O_2$ from the electrolyzer, for example, $O_2$ that was produced and stored during operation of an electrolyzer of the water-based $H_2$ production process. In some examples, the $N_2$-free $O_2$ stream can include $O_2$ from an air-separation unit. In some examples, the additional $O_2$ can help to produce an increased amount of $H_2$ without changing the balance of $N_2$. By substituting the water-based $H_2$ stream with additional carbon-based $H_2$, the $H_2$-to-$N_2$ ratio of an ammonia production feed can be maintained within operational limits of the ammonia plant.

In some instances, the by-product oxygen produced from the electrolyzers is partially used to combust a carbonaceous fuel in oxy-combustion mode, which can facilitate effective $CO_2$ capture, and can additionally produce low-carbon mechanical energy or power that, for example, can be used to drive equipment in the production process, or can be put on the grid.

FIG. 1 is a schematic diagram of a system 100 for producing ammonia in accordance with an embodiment of the disclosure. The system 100 includes an electrolyzer 102, an $O_2$ storage facility 118, a reformer 104, a water-gas shift reactor 106, a carbon-capture unit 108, and an ammonia production unit 110.

A water stream (not shown) is directed to the electrolyzer 102, for example, using a liquid pump. Water from the water stream is electrolyzed in electrolyzer 102 to form a first electrolysis stream 101 including $H_2$ and a second electrolysis stream 103 including $O_2$. In some embodiments, the electrolyzer 102 is an alkaline electrolyzer, a polymer electrolyte membrane electrolyzer, a solid oxide electrolyzer, or a membrane-less electrolyzer. In some embodiments, the electrolysis is driven by renewable energy, for example, solar energy. In some embodiments, the output of the first electrolysis stream 101 and the second electrolysis stream 103 is intermittent, for example, due to intermittent availability of renewable power to the electrolyzer 102.

In some embodiments, the first electrolysis stream 101 includes at least about 75 wt % $H_2$, or at least about 85 wt % $H_2$, or at least about 95 wt % $H_2$, or at least about 97.5 wt % $H_2$, or at least about 99 wt % $H_2$. In some embodiments, the first electrolysis stream 101 further includes water vapor. In some embodiments, water vapor and $H_2$ are present in the first electrolysis stream 101 in a combined amount of at least about 85 wt %, or at least about 95 wt %, or at least about 97.5 wt %, or at least about 99 wt %. In some embodiments, the electrolyzer 102 is a membrane-less electrolyzer, and the first electrolysis stream 101 includes $O_2$, for example, at least about 5 wt % $O_2$.

In some embodiments, the second electrolysis stream 103 includes at least about 75 wt % $O_2$, or at least about 85 wt % $O_2$, or at least about 95 wt % $O_2$, or at least about 97.5 wt % $O_2$, or at least about 99 wt % $O_2$. In some embodiments, the second electrolysis stream 103 further includes water vapor. In some embodiments, water vapor and $O_2$ are present in the second electrolysis stream 103 in a combined amount of at least about 85 wt %, or at least about 95 wt %, or at least about 97.5 wt %, or at least about 99 wt %. In some embodiments, the electrolyzer 102 is a membrane-less electrolyzer, and the second electrolysis stream 103 includes $H_2$, for example, at least about 5 wt % $H_2$.

In some embodiments, at least a portion of the second electrolysis stream 103 is directed as stream 131 to an $O_2$ storage facility 118. The $O_2$ storage facility 118 can store $O_2$ in liquid form, for example, from an $O_2$ liquefaction unit (not shown), or can store $O_2$ in high-pressure gaseous form, for example, from a compression unit (not shown). For example, the oxygen storage facility can include metal hydrides or sorbent materials that are capable of adsorbing and desorbing $O_2$. In some embodiments, the $O_2$ storage facility can provide $O_2$ to reformer 104 via stream 135.

A reformer feed stream 105 including hydrocarbons, an oxidant stream 107 including $O_2$ and $N_2$, and a stream 109 including a portion of the second electrolysis stream 103 including $O_2$ are directed to the reformer 104. For example, stream 109 can include $O_2$ from stream 145, stream 135, or both. In some embodiments, the first electrolysis stream 101, for example, from a membrane-less electrolyzer, includes $O_2$, and the stream 109 further includes at least a portion of the first electrolysis stream 103 including $O_2$ and $H_2$. In the embodiment of FIG. 1, the oxidant stream 107 and the stream 109 enter the reformer 104 separately. In other embodiments, the oxidant stream 107 and the stream 109 are combined before entering the reformer 104. In some embodiments, the reformer feed stream 105 is pre-heated, for example, to a temperature of about 350° C. to about 800° C.

In some embodiments, the reformer feed stream 105 includes short-chain hydrocarbons, for example, $C_{1-4}$ hydrocarbons such as methane or natural gas. In some embodiments, the reformer feed stream 105 further includes CO and $H_2$. In some embodiments, the reformer feed stream 105 includes methane, CO, and $H_2$ in a combined amount of at least about 75 wt %, or at least about 85 wt %, or at least about 95 wt %. In some embodiments, the reformer feed stream 105 includes the product of a partial reforming process, for example, a process for partially reforming $C_{1-25}$ hydrocarbons such as methane, naphtha, and light fuel oil (not shown; see, for example, FIG. 2). In some embodiments, the reformer feed stream 105 includes a heavy feedstock such as fuel oil, vacuum residues, petroleum coke, plastics, biomass, biofuel, or coal.

In some embodiments, the oxidant stream 107 includes at least about 50 wt % $N_2$, at least about 60 wt % $N_2$, or at least about 70 wt % $N_2$. In some embodiments, the oxidant stream 107 includes about 65 wt % to about 95 wt % $N_2$, and about 5 wt % to about 35 wt % $O_2$. In some embodiments, the oxidant stream 107 includes air. In some embodiments, the oxidant stream includes flue gases, for example, from a gas turbine.

In some embodiments, the composition of the stream 109 is substantially the same as the composition of the second electrolysis stream 103. In some embodiments, the stream 109 includes at least about 75 wt % $O_2$, or at least about 85 wt % $O_2$, or at least about 95 wt % $O_2$, or at least about 97.5 wt % $O_2$, or at least about 99 wt % $O_2$. In some embodiments, water vapor and $O_2$ are present in the stream 109 in a combined amount of at least about 85 wt %, or at least about 95 wt %, or at least about 97.5 wt %, or at least about 99 wt %. In some embodiments, the stream 109 includes less than 10 wt % $H_2$, or less than 5 wt % $H_2$, or less than 2.5 wt % $H_2$, or less than 1 wt % $H_2$. In some embodiments, the stream 109 is substantially free from $H_2$. In some embodiments, the second electrolysis stream includes a gasified portion of stored $O_2$ from $O_2$ storage facility 118.

Hydrocarbons from the reformer feed stream 105 are reformed in the reformer 104 to form a reformed stream 111 including $H_2$, CO, $CO_2$, and $N_2$. In some embodiments, the reformer 104 is a partial oxidation reformer. In some embodiments, the reformer 104 is an auto-thermal reformer (for example, including an auto-thermal reforming catalyst), and a stream including steam (not shown) is also directed to the reformer 104. In some embodiments, the reformer 104 is a partial oxidation reformer (for example, including a partial oxidation catalyst), and the reformer 104 is operated at a temperature of about 1,000° C. to about 1,200° C. In some embodiments, the reformer 104 is an auto-thermal reformer, and the reformer 104 is operated at a temperature of about 800° C. to about 1,000° C.

In some embodiments, the reformed stream 111 includes CO in an amount of about 0 wt % to about 30 wt %, $H_2$ in an amount of about 2 wt % to about 10 wt %, $CO_2$ in an amount of about 20 wt % to about 70 wt %, $N_2$ in an amount of about 20 wt % to about 60 wt %, $H_2O$ in an amount of about 0 wt % to about 40 wt %, and $CH_4$ in an amount of about 0 wt % and about 3 wt %. In some embodiments, heat is recovered from the reformed stream 111 and, for example, used to pre-heat another stream such as reformer feed stream 105, or used to produce steam that can be used in the process, generate mechanical power, or both.

The reformed stream 111 and a stream 113 including steam are directed to the water-gas shift reactor 106 (for example, including a water-gas shift catalyst). CO from the reformed stream 111 is reacted with steam from the stream 113 to form a shifted stream 115 including $N_2$ and, relative to the composition of the reformed stream 111, an increased amount of $H_2$ and $CO_2$ and a decreased amount of CO. In some embodiments, at least about 75%, or at least about 85%, or at least about 95%, or at least about 97.5%, or at least about 99% of the CO present in the reformed stream 111 is converted to $CO_2$ in the water-gas shift reactor 106. In some embodiments, the water-gas shift reactor 106 is a sour shift reactor (for example, including a sulfur-tolerant water-gas shift catalyst), for example, where the reformer feed stream 105 includes a heavy feedstock. In some embodiments, the water-gas shift reactor 106 is operated at a temperature of about 250° C. to about 500° C.

In some embodiments, the shifted stream 115 includes CO in an amount of about 0 wt % to about 3 wt %, $H_2$ in an amount of about 3 wt % to about 15 wt %, $CO_2$ in an amount of about 30 wt % to about 70 wt %, $N_2$ in an amount of about 20 wt % to about 60 wt %, $H_2O$ in an amount of about 0 wt % to about 30 wt %, and $CH_4$ in an amount of about 0 wt % to about 3 wt %. In some embodiments, the shifted stream 115 is substantially free from CO.

The shifted stream 115 is directed to the carbon capture unit 108. $CO_2$ is separated from the shifted stream 115 in the carbon capture unit 108 to form a captured stream 117 including $CO_2$ and an ammonia production feed stream 119 including $N_2$ and $H_2$, and, relative to the composition of the shifted stream 115, a decreased amount of $CO_2$. In some embodiments, other impurities such as sulfur-containing compounds are separated (in an "acid gas" carbon capture unit) from the shifted stream 115, into the captured stream 117, for example, where the reformer feed stream 105 includes a heavy feedstock. In some embodiments, $CO_2$ is separated from the shifted stream 115 by adsorption, absorption, or membrane or cryogenic separation.

In some embodiments, the ammonia production feed stream 119 is further treated in a methanation unit (not shown) to remove any remaining impurities, for example, harmful to an ammonia production unit. The ammonia production feed stream 119 can be further treated to remove $O_2$, for example, $O_2$ resulting from operation of a membrane-less electrolyzer.

In some embodiments, the ammonia production feed stream 119 includes at least about 75%, or at least about 85%, or at least about 95%, or at least about 97.5%, or at least about 99% of a combined amount of $H_2$ and $N_2$. In some embodiments, the ammonia production feed stream 119 is substantially free from $CO_2$.

In some embodiments, the molar ratio of the combined amount of $H_2$ present in the ammonia production feed stream 119 and the portion of the first electrolysis stream 101 directed to the ammonia production unit 110, to the amount of $N_2$ present in the ammonia production feed stream is at least 2.5:1, or at least 2.75:1, or at least 3:1, or at least 3.5:1.

An ammonia production mixture stream 121 including the ammonia production feed stream 119 is directed to the ammonia production unit 110. In some embodiments, the ammonia production mixture stream 121 further includes at least a portion of the first electrolysis stream 101 including $H_2$. In the embodiment of FIG. 1, the ammonia production feed stream 119 and the at least a portion of the first electrolysis stream 101 are combined into the ammonia production mixture before entering the ammonia production unit 110. In other embodiments, the ammonia production feed stream 119 and the at least a portion of the first electrolysis stream 101 enter the ammonia production unit 110 separately, forming the ammonia production mixture within the ammonia production unit 110.

In some embodiments, $H_2$ and $N_2$ are present in the ammonia production mixture stream 121 in a molar ratio of about 2.5:1 to about 3.5:1, or about 2.75:1 to about 3.25:1, or about 2.75:1 to about 3.5:1, or about 2.75:1 to about 3.25:1. In some embodiments, $H_2$ and $N_2$ are present in the ammonia production mixture stream 121 in a molar ratio of about 3:1.

In some embodiments, the amount of the first electrolysis stream 101 included in the ammonia production mixture stream 121 is independently selected to maintain the $H_2$ content of the ammonia production mixture stream 121 at a molar ratio to the $N_2$ present in the ammonia production mixture stream 121 in a range of about 2.5:1 to about 3.5:1, for example, about 3:1. In some embodiments, a portion of the first electrolysis stream 101, for example, a portion including $H_2$ not necessary to maintain the molar ratio of $H_2$ to $N_2$ present in the ammonia production stream 121 in a range of about 2.5:1 to about 3.5:1, is used for another application or stored, for example, outside of system 100.

In some embodiments, the amount of the oxidant stream 107 directed to the reformer 104 is independently selected to maintain an $H_2$ to $N_2$ content of the ammonia production mixture stream 121 in a range of about 2.5:1 to about 3.5:1, for example of about 3:1. In some embodiments, the amount of the reformer feed stream 105 and the amount of the stream 109, for example, substantially free from $N_2$, are independently selected to maintain the $H_2$ content of the ammonia production mixture stream 121 at a molar ratio to the $N_2$ present in the ammonia production mixture stream 121 in a range of about 2.5:1 to about 3.5:1, for example about 3:1. In some embodiments, the amount of the reformer feed stream 105 and the amount of the stream 109, for example, substantially free from $N_2$, are each increased after detecting a decreased output of the first electrolysis stream 101 from the electrolyzer 102, to maintain the $H_2$ content of the ammonia production mixture stream 121 at a molar ratio to the $N_2$ present in the ammonia production mixture stream 121 in a range of about 2.5:1 to about 3.5:1, for example about 3:1.

$H_2$ and $N_2$ from the ammonia production mixture stream 121 is reacted in the ammonia production unit 110 to form a product stream 123 including ammonia. In some embodiments, the ammonia production unit is a Haber-Bosch reactor.

Figure 2:
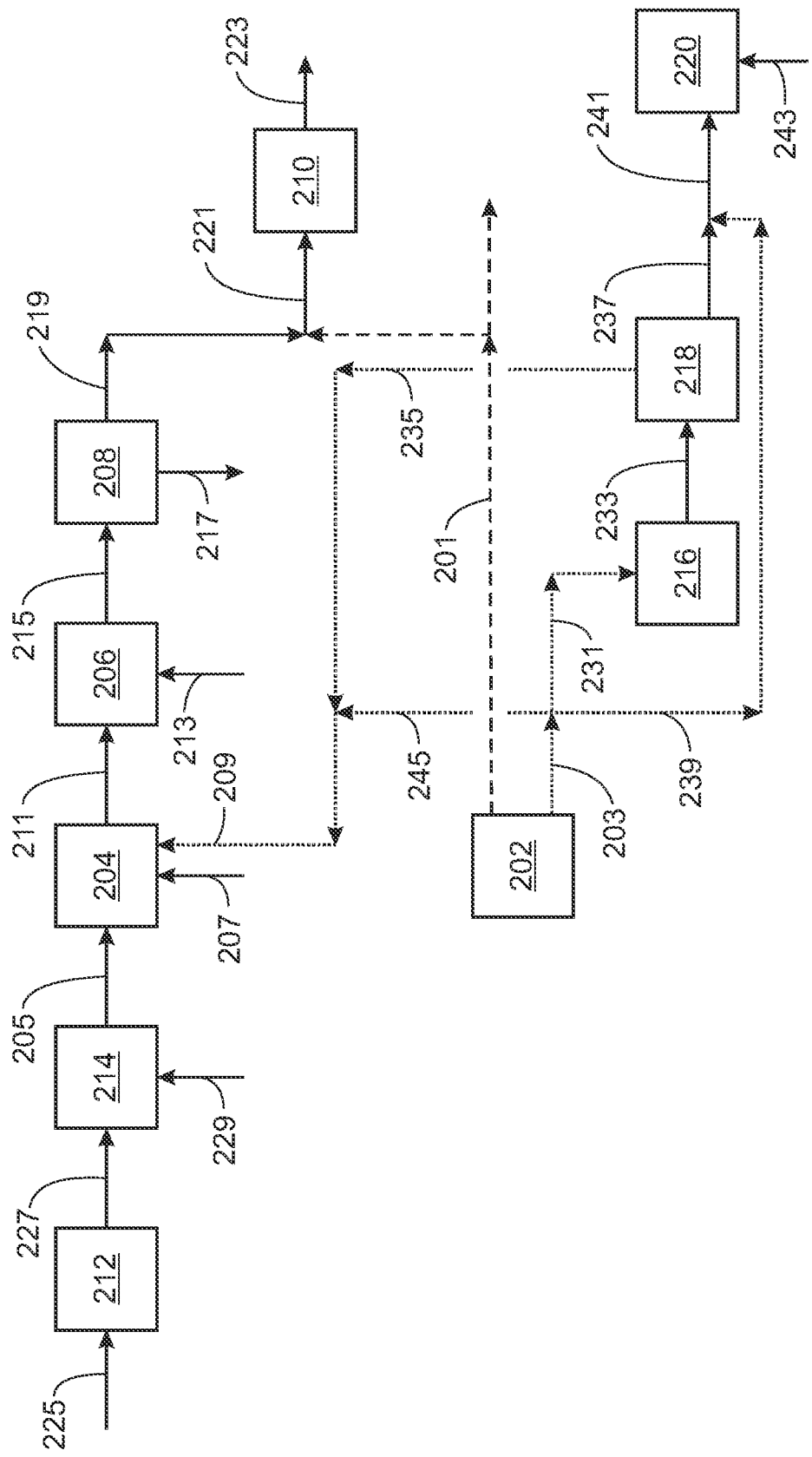
FIG. 2 is a schematic diagram of a system for producing ammonia.

In some embodiments, the system for producing ammonia further includes one or more of a power plant, a purification unit, a pre-reformer, an $O_2$ liquefaction unit, an $O_2$ storage facility (for example, a liquid or gaseous $O_2$ storage facility), and an air-separation unit. FIG. 2 is a schematic diagram of a system 200 for producing ammonia in accordance with an embodiment of the disclosure. The system includes an electrolyzer 202, a reformer 204, a water-gas shift reactor 206, a carbon-capture unit 208, an ammonia production unit 210, a purification unit 212, a pre-reformer 214, an $O_2$ liquefaction unit 216, an $O_2$ storage facility 218, and a power plant 220.

A purification feed stream 225 including hydrocarbons and a sulfur-containing impurity is directed to the purification unit 212. In some embodiments, the purification feed stream 225 includes $C_{1-25}$ hydrocarbons such as methane, naphtha, and light fuel oil. In some embodiments, the sulfur-containing impurity is selected from thiols, thiophenes, organic sulfides and disulfides, and combinations thereof.

The purification feed stream 225 is treated in the purification unit 212 to form a pre-reformer feed stream 227 including, relative to the purification feed stream 225, a decreased amount of the sulfur-containing impurity. In some embodiments, the purification unit 212 is a hydrodesulfurization reactor, and $H_2$ from a stream (not shown), for example including at least a portion of the first electrolysis stream including $H_2$, is reacted with the sulfur-containing impurity to form a stream including $H_2S$ (not shown), for example, separated using a solid sorbent or other technology known to the person skilled in the art.

In some embodiments, at least about 95%, or at least about 97.5%, or at least about 99% of the sulfur-containing impurity present in the purification feed stream 225 is separated in the purification unit 212. In some embodiments, the pre-reformer feed stream 227 includes less than 1 wt %, or less than 0.5 wt % of sulfur-containing compounds. In some embodiments, the pre-reformer feed stream 227 is substantially free from sulfur-containing compounds.

The pre-reformer feed stream 227 and a stream 229 including steam are directed to the pre-reformer 214. Hydrocarbons from the pre-reformer feed stream 227 are partially reformed in the pre-reformer 214 to form the reformer feed stream 205 including $CH_4$, $H_2$, CO, $CO_2$, and $H_2O$. Pre-reformer 214 can be gas-heated, for example, by heat recovered from turbine exhaust gases, or by heat recovered from the reformed stream 211. In some examples, the pre-reformer 214 is electrically heated, for example, using electrical energy from power plant 220. In another example, pre-reformer 214 is operated in adiabatic mode, by utilizing intrinsic heat from exothermic reactions to compensate the endothermic reactions. In some embodiments, the pre-reformer 214 is operated at a temperature of 350° C. to 600° C., for example, in adiabatic mode at a temperature of 500° C. to 600° C. In some embodiments, the pre-reformer 214 is operated at a pressure of 10 bar to 60 bar.

A water stream (not shown) is directed to the electrolyzer 202, for example, using a liquid pump. Water from the water stream is electrolyzed in electrolyzer 202 to form a first electrolysis stream 201 including $H_2$ and a second electrolysis stream 203 including $O_2$. In some embodiments, the electrolyzer 202 is an alkaline electrolyzer, a polymer electrolyte membrane electrolyzer, a solid oxide electrolyzer, or a membrane-less electrolyzer. In some embodiments, the electrolysis is driven by renewable energy, for example, solar energy. In some embodiments, the output of the first electrolysis stream 201 and the second electrolysis stream 203 is intermittent, for example, due to intermittent availability of renewable power to the electrolyzer 202.

In some embodiments, the first electrolysis stream 201 includes at least about 75 wt % $H_2$, or at least about 85 wt % $H_2$, or at least about 95 wt % $H_2$, or at least about 97.5 wt % $H_2$, or at least about 99 wt % $H_2$. In some embodiments, the first electrolysis stream 201 further includes water vapor. In some embodiments, water vapor and $H_2$ are present in the first electrolysis stream 201 in a combined amount of at least about 85 wt %, or at least about 95 wt %, or at least about 97.5 wt %, or at least about 99 wt %. In some embodiments, the electrolyzer 202 is a membrane-less electrolyzer, and the first electrolysis stream 201 includes $O_2$, for example, at least about 5 wt % $O_2$.

In some embodiments, the second electrolysis stream 203 includes at least about 75 wt % $O_2$, or at least about 85 wt % $O_2$, or at least about 95 wt % $O_2$, or at least about 97.5 wt % $O_2$, or at least about 99 wt % $O_2$. In some embodiments, the second electrolysis stream 103 further includes water vapor. In some embodiments, water vapor and $O_2$ are present in the second electrolysis stream 203 in a combined amount of at least about 85 wt %, or at least about 95 wt %, or at least about 97.5 wt %, or at least about 99 wt %. In some embodiments, the electrolyzer 202 is a membrane-less electrolyzer, and the second electrolysis stream 203 includes $H_2$, for example, at least about 5 wt % $H_2$.

A portion of the second electrolysis stream 203 including $O_2$ is directed as stream 231 to the $O_2$ liquefaction unit 216. $O_2$ from the stream 231 is liquefied to form a stream 233 including liquid $O_2$. Stream 233 is directed to the $O_2$ storage facility 218. Liquid $O_2$ from the stream 233 is stored in the $O_2$ storage facility 218. In some embodiments, for example where the electrolyzer 202 is operating at capacity, at least 20 wt %, or at least 60 wt % or at least 80 wt %, or at least 90 wt % of $O_2$ present in the second electrolysis stream 203 is liquefied in the $O_2$ liquefaction unit 216 and then stored in the $O_2$ storage facility 218.

In some embodiments, at least a portion of the liquid $O_2$ stored in the $O_2$ storage facility 218 is gasified and then directed as stream 235 to the reformer 204, for example, upon detecting a decreased output of the first electrolysis stream 201 from the electrolyzer 202. In some embodiments, the gasification of liquid $O_2$ stored in the $O_2$ storage facility 218 is used to provide cooling for, for example, $CO_2$ separation in carbon capture unit 208 or power plant 220, or for liquefaction of ammonia produced in unit 210 for subsequent separation and storage (not shown).

A stream 241 including a portion of the second electrolysis stream including $O_2$ and a fuel feed stream 243 including a combustible fuel are directed to the power plant 220. In some embodiments, the stream 241 includes a portion of the second electrolysis stream 203 including $O_2$, directed as bypass stream 239. In some embodiments, the stream 241 includes a gasified portion of the liquid $O_2$ stored in the $O_2$ storage facility 218, directed as stored stream 237, for example, sufficient to compensate for a decreased output of the second electrolysis stream 203 from the electrolyzer 202. In the embodiment of FIG. 2, the stream 241 and the fuel feed stream 243 enter the power plant 220 separately. In other embodiments, the stream 241 and the fuel feed stream 243 are combined before entering the power plant 220.

In some embodiments, the stream 241 includes less than 10 wt % $H_2$, or less than 5 wt % $H_2$, or less than 2.5 wt % $H_2$, or less than 1 wt % $H_2$. In some embodiments, the stream 241 is substantially free from $H_2$.

An oxy-fuel combustion mixture of $O_2$ from stream 241 and combustible fuel from the fuel feed stream 243 is combusted in the power plant 220 to produce thermal energy. The produced thermal energy is converted to mechanical and, in some examples, electrical energy, and at least a portion of $CO_2$ formed by combusting the oxy-fuel combustion mixture is captured. In some embodiments, the power plant 220 includes an oxy-fired broiler, an oxy-fired gasifier or an oxy-fired gas turbine.

In some embodiments, a portion of the captured $CO_2$ is processed and recycled to the oxy-fuel combustion mixture, to control the temperature of combustion, and a portion of the captured $CO_2$ is removed from the power plant 220 as a captured stream (not shown). In some embodiments, the oxy-fuel combustion process includes compressing at least a portion of the captured $CO_2$ to form supercritical $CO_2$ for recycle to the oxy-fuel combustion process, and combusting the oxy-fuel combustion mixture including the supercritical $CO_2$ to form a high-pressure exhaust stream. The high-pressure exhaust stream is expanded to produce power and a medium-pressure exhaust, from which $CO_2$ is captured and a portion re-compressed for recycle to the oxy-fuel combustion process.

In some embodiments, a portion of the reformed stream 211 including CO is separated in a CO separation unit (not shown) to form the fuel feed stream 243, for example, by adsorption, absorption, or membrane separation.

In some embodiments, air is separated in an air-separation unit (not shown) to form an air-separated stream including $O_2$. In some embodiments, at least a portion of the air-separated stream including $O_2$ is directed to the reformer 204, for example, to increase the production capacity of the reformer 204. In some embodiments, at least a portion of the air-separated stream is directed to the power plant 220, for example, to increase the production capacity of the power plant 220. In some embodiments, at least a portion of the air-separated stream including $O_2$ is directed to the $O_2$ liquefaction system 216, and $O_2$ from the air-separated stream is stored as liquid $O_2$ in the $O_2$ storage system 218.

A reformer feed stream 205 including hydrocarbons, an oxidant stream 207 including $O_2$ and $N_2$, and a stream 209 including a portion of the second electrolysis stream 203 including $O_2$ (directed as stream 245), are directed to the reformer 204. In some embodiments, the first electrolysis stream 201, for example, from a membrane-less electrolyzer, includes $O_2$, and the stream 209 further includes a portion of the second electrolysis stream 203 including $O_2$ and $H_2$. In the embodiment of FIG. 2, the oxidant stream 207 and stream 209 enter the reformer 204 separately. In other embodiments, the oxidant stream 207 and stream 209 are combined before entering the reformer 204. In some embodiments, the reformer feed stream 205 is pre-heated, for example, to a temperature of about 350° C. to about 800° C.

In some embodiments, the reformer feed stream 205 includes short-chain hydrocarbons, for example, $C_{1-4}$ hydrocarbons such as methane. In some embodiments, the reformer feed stream 205 further includes CO and $H_2$. In some embodiments, the reformer feed stream 205 includes methane, CO, and $H_2$ in a combined amount of at least about 75 wt %, or at least about 85 wt %, or at least about 95 wt %.

In some embodiments, the oxidant stream 207 includes at least about 50 wt % $N_2$, at least about 60 wt % $N_2$, or at least about 70 wt % $N_2$. In some embodiments, the oxidant stream 207 includes about 65 wt % to about 95 wt % $N_2$, and about 5 wt % to about 35 wt % $O_2$. In some embodiments, the oxidant stream 207 includes air. In some embodiments, the oxidant stream includes flue gases, for example, from a gas turbine.

In some embodiments, the composition of stream 209 is substantially the same as the composition of the second electrolysis stream 203. In some embodiments, the stream 209 includes at least about 75 wt % $O_2$, or at least about 85 wt % $O_2$, or at least about 95 wt % $O_2$, or at least about 97.5 wt % $O_2$, or at least about 99 wt % $O_2$. In some embodiments, water vapor and $O_2$ are present in the stream 209 in a combined amount of at least about 85 wt %, or at least about 95 wt %, or at least about 97.5 wt %, or at least about 99 wt %. In some embodiments, the stream 209 includes less than 10 wt % $H_2$, or less than 5 wt % $H_2$, or less than 2.5 wt % $H_2$, or less than 1 wt % $H_2$. In some embodiments, the stream 209 is substantially free from $H_2$.

Hydrocarbons from the reformer feed stream 205 are reformed in the reformer 204 to form a reformed stream 211 including $H_2$, CO, $CO_2$, and $N_2$. In some embodiments, the reformer 204 is a partial oxidation reformer. In some embodiments, the reformer 204 is an auto-thermal reformer (for example, including an auto-thermal reforming catalyst), and a stream including steam (not shown) is also directed to the reformer 204. In some embodiments, the reformer 204 is a partial oxidation reformer (for example, that can include a partial oxidation catalyst), and the reformer 204 is operated at a temperature of about 1,000° C. to about 1,200° C. In some embodiments, the reformer 104 is an auto-thermal reformer, and the reformer 104 is operated at a temperature of about 800° C. to about 1,000° C.

In some embodiments, the reformed stream 211 includes CO in an amount of about 0 wt % to about 30 wt %, $H_2$ in an amount of about 2 wt % to about 10 wt %, $CO_2$ in an amount of about 20 wt % to about 70 wt %, $N_2$ in an amount of about 20 wt % to about 60 wt %, $H_2O$ in an amount of about 0 wt % to about 40 wt %, and $CH_4$ in an amount of about 0 wt % to about 3 wt %. In some embodiments, heat is recovered from reformed stream 211 and, for example, used to pre-heat another stream such as reformer feed stream 205.

The reformed stream 211 and a stream 213 including steam are directed to the water-gas shift reactor 206 (for example, including a water-gas shift catalyst). CO from the reformed stream 211 is reacted with steam from the stream 213 to form a shifted stream 215 including $N_2$ and, relative to the composition of the reformed stream 211, an increased amount of $H_2$ and $CO_2$ and a decreased amount of CO. In some embodiments, at least about 75%, or at least about 85%, or at least about 95%, or at least about 97.5%, or at least about 99% of the CO present in the reformed stream 211 is converted to $CO_2$ in the water-gas shift reactor 206. In some embodiments, the water-gas shift reactor 206 is operated at a temperature of about 250° C. to about 500° C.

In some embodiments, the shifted stream 215 includes CO in an amount of about 0 wt % to about 3 wt %, $H_2$ in an amount of about 3 wt % to about 15 wt %, $CO_2$ in an amount of about 30 wt % to about 70 wt %, $N_2$ in an amount of about 20 wt % to about 60 wt %, $H_2O$ in an amount of about 0 wt % to about 30 wt %, and $CH_4$ in an amount of about 0 wt % to about 3 wt %. In some embodiments, the shifted stream 215 is substantially free from CO.

The shifted stream 215 is directed to the carbon capture unit 208. $CO_2$ is separated from the shifted stream 215 in the carbon capture unit 208 to form a captured stream 217 including $CO_2$ and an ammonia production feed stream 219 including $N_2$ and $H_2$, and, relative to the composition of the shifted stream 215, a decreased amount of $CO_2$. In some embodiments, other impurities such as sulfur-containing compounds are separated from the shifted stream 215, into the captured stream 217. In some embodiments, $CO_2$ is separated from the shifted stream 215 by adsorption, absorption, or membrane or cryogenic separation.

In some embodiments, the ammonia production feed stream 219 is further treated in a methanation unit (not shown) to remove any remaining impurities, for example, harmful to an ammonia production unit. The ammonia production feed stream 219 can be further treated to remove $O_2$, for example, $O_2$ resulting from operation of a membrane-less electrolyzer.

In some embodiments, the ammonia production feed stream 219 includes at least about 75%, or at least about 85%, or at least about 95%, or at least about 97.5%, or at least about 99% of a combined amount of $H_2$ and $N_2$. In some embodiments, the ammonia production feed stream 219 is substantially free from $CO_2$.

In some embodiments, the molar ratio of the combined amount of $H_2$ present in the ammonia production feed stream 219 and the portion of the first electrolysis stream 201 routed to the ammonia production unit 210, to the amount of $N_2$ present in the ammonia production feed stream is at least 2.5:1, or at least 2.75:1, or at least 3:1, or at least 3.5:1.

An ammonia production mixture stream 221 including the ammonia production feed stream 219 is directed to the ammonia production unit 210. In some embodiments, the ammonia production mixture stream 221 further includes at least a portion of the first electrolysis stream 201 including $H_2$. In the embodiment of FIG. 2, the ammonia production feed stream 219 and the at least a portion of the first electrolysis stream 201 are combined into the ammonia production mixture before entering the ammonia production unit 210. In other embodiments, the ammonia production feed stream 219 and the at least a portion of the first electrolysis stream 201 enter the ammonia production unit 210 separately, forming the ammonia production mixture within the ammonia production unit 210.

In some embodiments, $H_2$ and $N_2$ are present in the ammonia production mixture stream 221 in a molar ratio of about 2.5:1 to about 3.5:1, or about 2.75:1 to about 3.25:1. or about 2.75:1 to about 3.5:1, or about 2.75:1 to about 3.25:1. In some embodiments, $H_2$ and $N_2$ are present in the ammonia production mixture stream 221 in a molar ratio of about 3:1.

In some embodiments, the amount of the first electrolysis stream 201 included in the ammonia production mixture stream 221 is independently selected to maintain the $H_2$ content of the ammonia production mixture stream 221 at a molar ratio to the $N_2$ present in the ammonia production mixture stream 221 in a range of about 2.5:1 to about 3.5:1, for example, about 3:1. In some embodiments, a portion of the first electrolysis stream 201, for example, a portion including $H_2$ not necessary to maintain the molar ratio of $H_2$ to $N_2$ present in the ammonia production stream 221 in a range of about 2.5:1 to about 3.5:1, is used for another application or stored, for example, outside of system 200.

In some embodiments, the amount of the oxidant stream 207 directed to the reformer 204 is independently selected to maintain an $H_2$ to $N_2$ content of the ammonia production mixture stream 221 in a range of about 2.5:1 to about 3.5:1, for example of about 3:1. In some embodiments, the amount of the reformer feed stream 205 and the amount of the stream 209, for example, substantially free from $N_2$, are independently selected to maintain the $H_2$ content of the ammonia production mixture stream 221 at a molar ratio to the $N_2$ present in the ammonia production mixture stream 221 in a range of about 2.5:1 to about 3.5:1, for example about 3:1. In some embodiments, the amount of the reformer feed stream 205 and the amount of the stream 209, for example, substantially free from $N_2$, are each increased after detecting a decreased output of the first electrolysis stream 201 from the electrolyzer 202, to maintain the $H_2$ content of the ammonia production mixture stream 221 at a molar ratio to the $N_2$ present in the ammonia production mixture stream 221 in a range of about 2.5:1 to about 3.5:1, for example about 3:1.

$H_2$ and $N_2$ from the ammonia production mixture stream 221 is reacted in the ammonia production unit 210 to form a product stream 223 including ammonia. In some embodiments, the ammonia production unit is a Haber-Bosch reactor.

Figure 3:
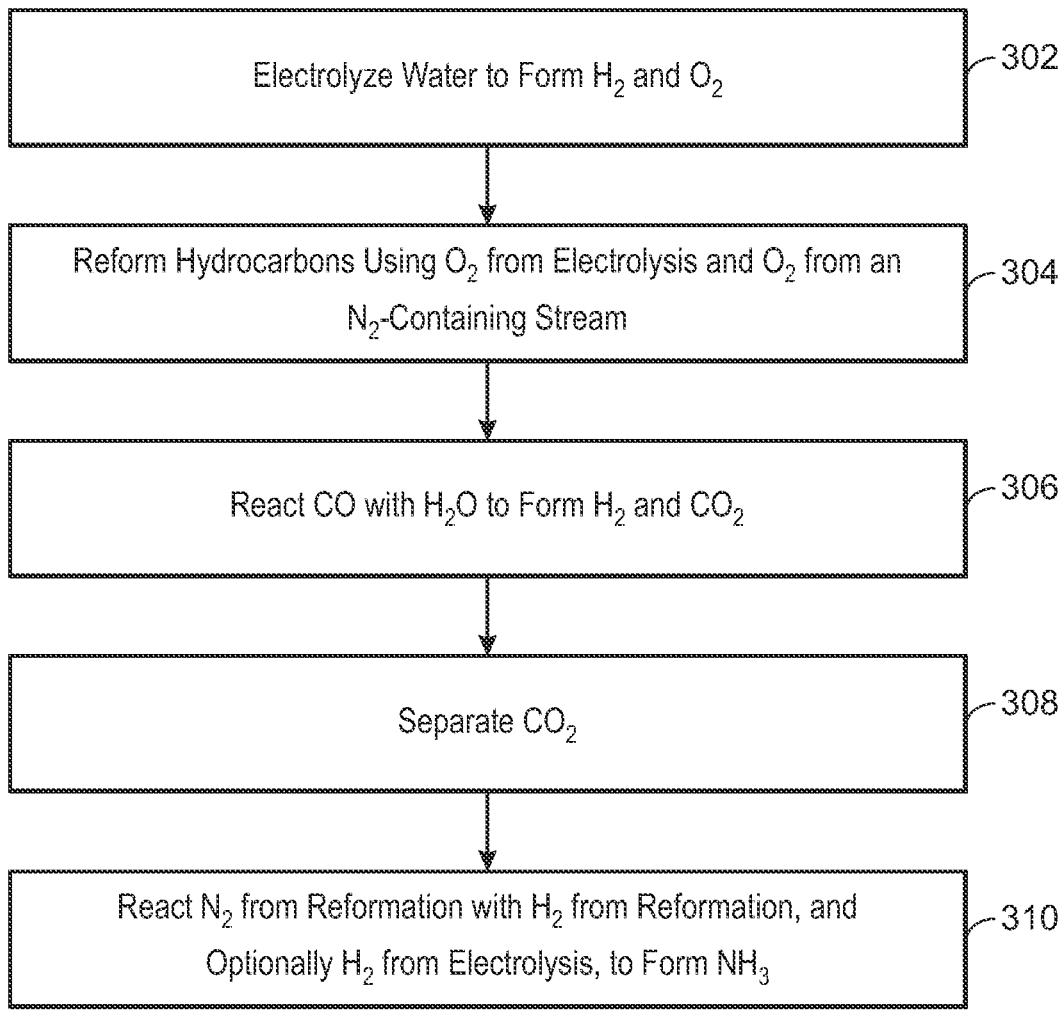
FIG. 3 is a process flow diagram of a method for producing ammonia.

FIG. 3 is a process flow diagram of a method 300 for producing ammonia. The method starts at block 302 with the electrolysis of water to form a first electrolysis stream including $H_2$ and a second electrolysis stream including $O_2$. At block 304, a reformer feed stream including hydrocarbons, at least a portion of the second electrolysis stream including $O_2$, and an oxidant stream including $O_2$ and $N_2$ are contacted to form a reformed stream including $H_2$, CO, $CO_2$, and $N_2$. At block 306, at least a portion of the reformed stream is contacted with a water-gas shift catalyst to form a shifted stream including $H_2$, $CO_2$, and $N_2$. At block 308, at least a portion of the shifted stream is separated to form a captured stream including $CO_2$ and an ammonia production feed stream including $H_2$ and $N_2$. At block 310, an ammonia production mixture including at least a portion of the ammonia production feed stream including $H_2$ and $N_2$, and optionally at least a portion of the first electrolysis stream including $H_2$, is reacted to form a product stream including ammonia.

Figure 4:
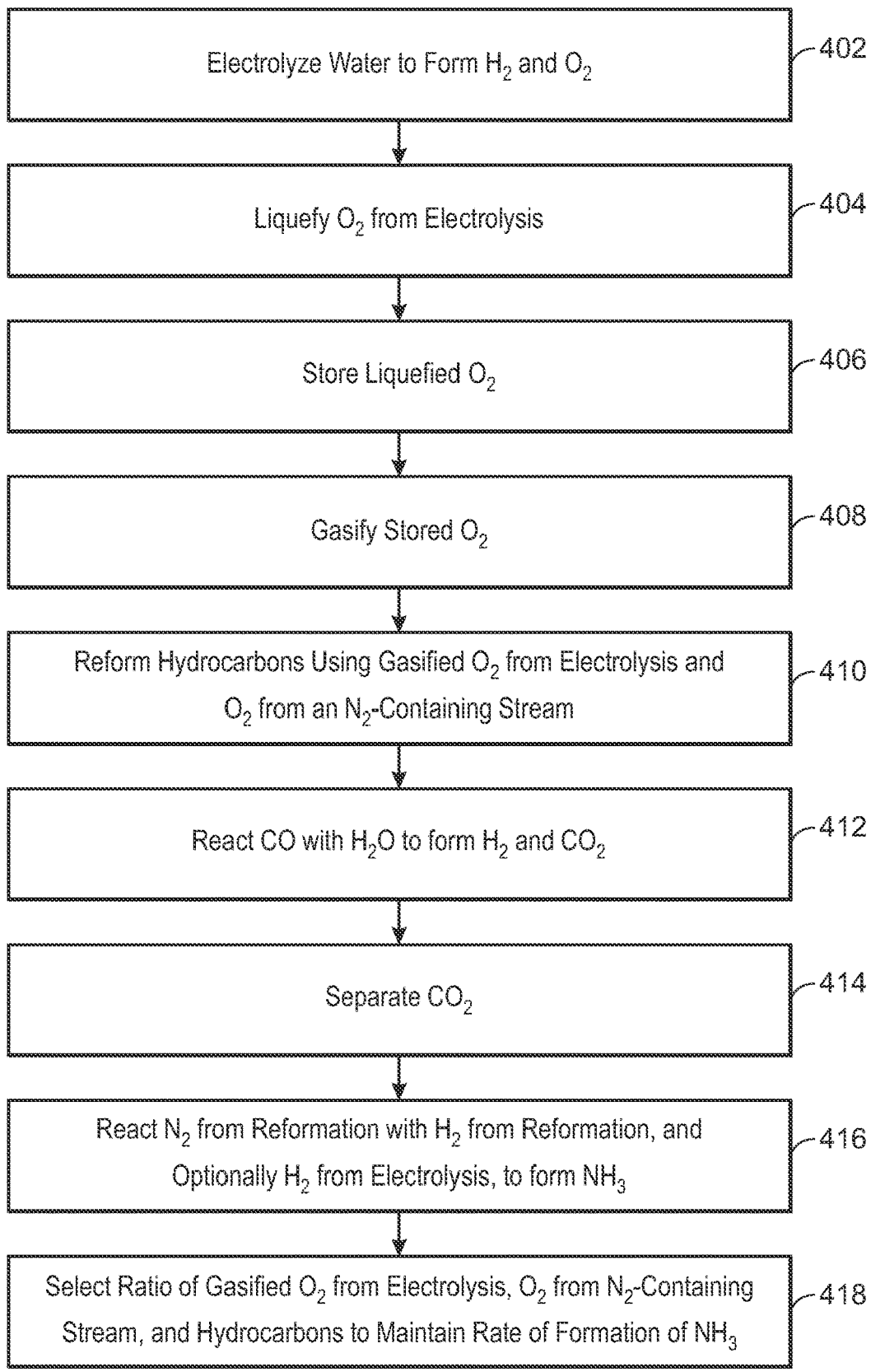
FIG. 4 is a process flow diagram of a method for producing ammonia.

FIG. 4 is a process flow diagram of a method 400 for producing ammonia. The method starts at block 402 with the electrolysis of water to form a first electrolysis stream including $H_2$ and a second electrolysis stream including $O_2$. At block 404, at least a portion of the second electrolysis stream including $O_2$ is liquefied to form liquid $O_2$, and at block 406, the liquid $O_2$ is stored. At block 408, at least a portion of the stored liquid $O_2$ is gasified. At block 410, a reformer feed stream including hydrocarbons, at least a portion of the second electrolysis stream including the gasified $O_2$, and an oxidant stream including $O_2$ and $N_2$ are contacted to form a reformed stream including $H_2$, CO, $CO_2$, and $N_2$. At block 412, at least a portion of the reformed stream is contacted with a water-gas shift catalyst to form a shifted stream including $H_2$, $CO_2$, and $N_2$. At block 414, at least a portion of the shifted stream is separated to form a captured stream including $CO_2$ and an ammonia production feed stream including $H_2$ and $N_2$. At block 416, an ammonia production mixture including at least a portion of the ammonia production feed stream including $H_2$ and $N_2$, and optionally at least a portion of the first electrolysis stream including $H_2$, is reacted to form a product stream including ammonia. At block 418, a ratio of an amount of each of the gasified $O_2$, the oxidant stream, and the reformer stream contacted to form the reformed stream is selected to maintain a rate of formation of the product stream that is at least 50% of a maximum rate of formation of the product stream. A molar ratio of $H_2$ to $N_2$ present in the ammonia production mixture can be about 2.5:1 to about 3.5:1. As used in this disclosure, the maximum rate of formation of the product stream can be referred to as a "design point," and refers to the ammonium production capacity of the process when water electrolysis is operating at full capacity.

Figure 5:
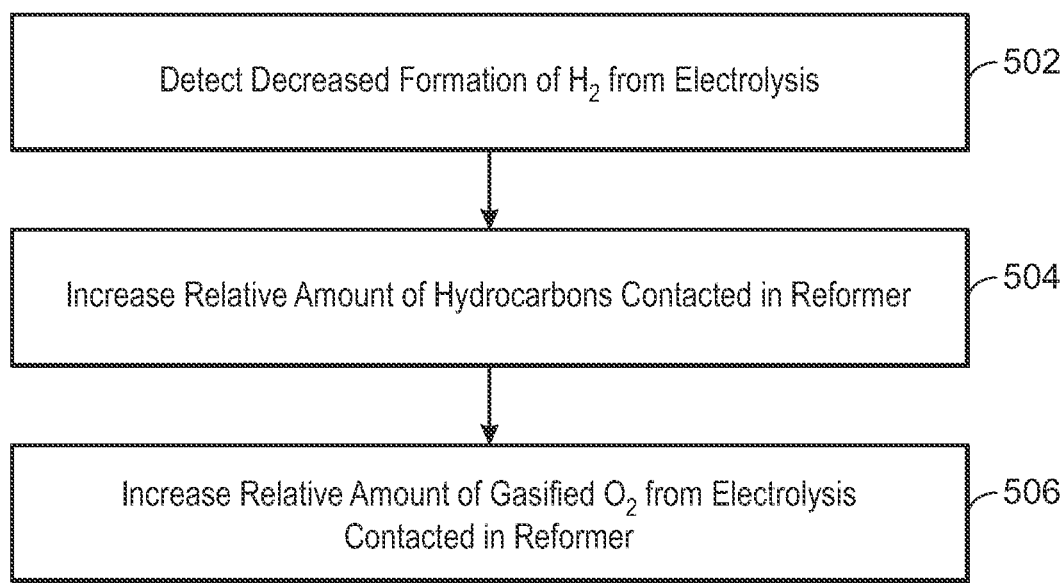
FIG. 5 is a process flow diagram of a method for producing ammonia.

FIG. 5 is a process flow diagram of a method 500 for producing ammonia using a system of the present disclosure. The method starts at block 502 with the detection of a decreased amount of a first electrolysis stream containing $H_2$ formed by an electrolyzer. At block 504, an amount of a reformer feed stream including hydrocarbons contacted in a reformer is increased relative to an amount of an oxidant stream including $O_2$ and $N_2$. At block 506, an amount of gasified $O_2$, formed by liquefying and storing $O_2$ from the electrolyzer, contacted in a reformer is increased relative to an amount of an oxidant stream including $O_2$ and $N_2$, after which the molar ratio of a total amount of $H_2$ present in the first electrolysis stream and a shifted product of a reformed stream from the reformer to a total amount of —$N_2$ present in the reformed stream is at least about 2.5.

Scenarios of the ammonia production process were modeled, with and without an integrated power plant. Streams are labeled to correspond to FIG. 2.

Example 1: Ammonia Production Process without Air-Separation Unit and without Power Production Plant In this simulation, the electrolyzer was only operated for ⅓ of the time during a day. The process flows calculated by the simulation are summarized in Table 1, below. All values are on a mass basis, referenced to the ammonia maximum output with a value of 100.

TABLE 1

| Stream (Content) | Elec. 202 On | Elec. 202 Off (1) | Elec. 202 Off (2) | Elec. 202 On (C) |
|---|---|---|---|---|
| 201 ($H_2$) | 9.3 | 0 | 0 | 7 |
| 219 ($H_2$) | 8.4 | 17.8 | 12.4 | 10.7 |
| 223 ($NH_3$) | 100 | 100 | 70 | 100 |
| 203 ($O_2$) | 74 | 0 | 0 | 56 |
| 245 ($O_2$) | 0 | 0 | 0 | 0 |
| 231 ($O_2$) | 74 | 0 | 0 | 56 |
| 235 ($O_2$) | 0 | 28 | 19.6 | 0 |
| 207 ($O_2$)* | 25 | 25 | 17.7 | — |
| (ex. $O_2$)** | — | 9 | 17.4 | 32 |
| 221 (excess $N_2$) | 0 | 0 | 0 | 27% |

*$O_2$ content of stream 207, where stream 207 is air;
**Excess $O_2$ available from $O_2$ storage facility 218

The ratio of the operation of ammonia production unit 210 relative to full capacity was 100% for the "on" scenario, 100% for the "off (1)" scenario, 70% for the "off (2)" scenario, and 100% for the "on (C)" scenario. The ratio of the operation of reformer 204 in the "on" scenario to that of the "off (1)" and "off (2)" scenarios was 48% and 68%, respectively. The ratio of the operation of reformer 204 in the "on (C)" scenario to that of the "off (1)" and "off (2)" scenarios was 60% and 86%, respectively.

The "off (1)" and "off (2)" results demonstrate that ammonia production can be maintained, even when $H_2$ from an electrolyzer is unavailable, by independently controlling the $N_2$ content and $H_2$ content of the reformed stream to compensate for the unavailable electrolyzer $H_2$, while using stored $O_2$ produced from electrolysis and avoiding introducing excess $N_2$ into the process as compared to using air. The results moreover demonstrate that the ammonia production can be maintained at high output levels without $O_2$ from an air-separator.

Example 2: Ammonia Production Process with an Oxy-Fired Power Production Plant without Air-Separation Unit In this simulation, the electroylzer was only operated for ⅓ of the time during a day. The process flows calculated by the simulation are summarized in Table 2, below. All values are on a mass basis, referenced to the ammonia maximum output with a value of 100.

TABLE 2

| Stream (Content) | Elec. 202 On (1) | Elec. 202 Off (1) | Elec. 202 On (2) | Elec. 202 Off (2) | Elec. 202 On (3) | Elec. 202 Off (C) |
|---|---|---|---|---|---|---|
| 201 ($H_2$) | 9.3 | 0 | 9.3 | 0 | 9.3 | 0 |
| 219 ($H_2$) | 8.4 | 17.8 | 8.4 | 12.4 | 8.4 | 12.4 |

TABLE 2-continued

| Stream (Content) | Elec. 202 On (1) | Elec. 202 Off (1) | Elec. 202 On (2) | Elec. 202 Off (2) | Elec. 202 On (3) | Elec. 202 Off (C) |
|---|---|---|---|---|---|---|
| 223 ($NH_3$) | 100 | 100 | 100 | 70 | 100 | 70 |
| 203 ($O_2$) | 74 | 0 | 74 | 0 | 74 | 0 |
| 245 ($O_2$) | 0 | 0 | 0 | 0 | 0 | 0 |
| 231 ($O_2$) | 68 | 0 | 62 | 0 | 61 | 0 |
| 235 ($O_2$) | 0 | 28 | 0 | 19.6 | 0 | 11 |
| 239 ($O_2$) | 6 | 0 | 12 | 0 | 13 | 0 |
| 237 ($O_2$) | 0 | 6 | 0 | 12 | 0 | 20 |
| 207 ($O_2$)* | 25 | 25 | 25 | 17.7 | 25 | 26.6 |
| 221 (ex. $N_2$) | 0 | 0 | 0 | 0 | 0 | 50% |

*$O_2$ content of stream 207, where stream 207 is air

The ratio of the operation of ammonia production unit 210 relative to full capacity was 100% for the "on (1)" scenario, 100% for the "off (1)" scenario, 100% for the "on (2)" scenario, 70% for the "off (2)" scenario, 100% for the "on (3)" scenario, and 70% for the "off (C)" scenario. The ratio of the operation of reformer 204 in the "on (1)" scenario to that of the "off (1)" was 48%, the ratio of the operation of reformer 204 in the "on (2)" scenario to that of the "off (2)" was 68%, and the ratio of the operation of reformer 204 in the "on (3) scenario to that of the "off (C)" scenario was 68%.

The "off (1)" and "off (2)" results demonstrate that ammonia production can be maintained, as in Example 1, while utilizing available excess $O_2$ to produce power in an integrated oxy-fired combustion process from which $CO_2$ can be easily captured.

EMBODIMENTS

An embodiment described herein provides a method for producing ammonia. The method includes electrolyzing water to form a first electrolysis stream including $H_2$ and a second electrolysis stream including $O_2$. A reformer feed stream including hydrocarbons, at least a portion of the second electrolysis stream including $O_2$, and an oxidant stream including $O_2$ and $N_2$ are contacted under conditions suitable to form a reformed stream including $H_2$, CO, $CO_2$, and $N_2$. At least a portion of the reformed stream is contacted with a water-gas shift catalyst under conditions suitable to form a shifted stream including $H_2$, $CO_2$, and $N_2$, and at least a portion of the shifted stream is separated to form a captured stream including $CO_2$ and an ammonia production feed stream including $H_2$ and $N_2$. The method includes reacting an ammonia production mixture including at least a portion of the ammonia production feed stream including $H_2$ and $N_2$, and optionally at least a portion of the first electrolysis stream including $H_2$, to form a product stream including ammonia.

In an aspect, the method further includes liquefying at least a portion of the second electrolysis stream including $O_2$ to form liquid $O_2$; and storing the liquid $O_2$. In an aspect, the method further includes gasifying at least a portion of the stored liquid $O_2$, wherein forming the reformed stream includes contacting the reformer feed stream and the oxidant stream with at least a portion of the second electrolysis stream including the gasified $O_2$.

In an aspect, the method further includes selecting a ratio of an amount of the gasified $O_2$ contacted to form the reformed stream, an amount of the oxidant stream contacted to form the reformed stream, and an amount of the reformer feed stream contacted to form the reformed stream, to maintain a rate of formation of the product stream that is at least 50% of a maximum rate of formation of the product stream corresponding to a maximum rate of formation of the first electrolysis stream. In an aspect, a molar ratio of $H_2$ to $N_2$ present in the ammonia production mixture is about 2.5:1 to about 3.5:1. In an aspect, a molar ratio of a total amount of $H_2$ present in the first electrolysis stream and $H_2$ present in the shifted stream to a total amount of $N_2$ present in the reformed stream is at least about 2.5.

In an aspect, the method further includes combusting an oxy-fuel combustion mixture including a portion of the second electrolysis stream including $O_2$, and a fuel feed stream including a combustible fuel to produce thermal energy, converting at least a portion of the thermal energy to electrical energy, and capturing at least a portion of $CO_2$ formed by combusting the oxy-fuel combustion mixture. In an aspect, the method further includes combusting an oxy-fuel combustion mixture including a portion of the second electrolysis stream including $O_2$, a fuel feed stream including a combustible fuel, and a compressed $CO_2$ stream including supercritical $CO_2$ to form a high-pressure exhaust, expanding the high-pressure exhaust to produce electrical energy, and compressing at least a portion of the expanded exhaust to form the compressed $CO_2$ stream. In an aspect, the method further includes separating a portion of the reformed stream including CO to form the fuel feed stream.

In an aspect, the reformer feed stream includes a heavy feedstock, the water-gas shift catalyst includes a sulfur-tolerant water-gas shift catalyst, and the captured stream further includes one or more sulfur-containing compounds. In an aspect, the method further includes contacting a partial-reformer feed stream including hydrocarbons, and steam with a partial-reforming catalyst under conditions suitable to form the reformer feed stream, the average hydrocarbon chain length of the partial-reformer feed stream being greater than the average hydrocarbon chain length of the reformer feed stream. In an aspect, the method further includes contacting a purification feed stream including hydrocarbons and a sulfur-containing impurity, and at least a portion of the first electrolysis stream including $H_2$ with a hydro-desulfurization catalyst under conditions suitable to form the partial-reformer feed stream, the amount of the sulfur-containing impurity present in the purification feed stream being greater than an amount of the sulfur-containing impurity present in the partial-reformer feed stream.

In an aspect, the second electrolysis stream includes less than 10 wt % $H_2$. In an aspect, the second electrolysis stream is substantially free from $H_2$. In an aspect, the electrolysis is driven by renewable energy.

In an aspect, forming the reformed stream includes contacting the reformer feed stream, the at least a portion of the second electrolysis stream including $O_2$, the oxidant stream including $O_2$ and $N_2$, and steam with an auto-thermal reforming catalyst. In an aspect, the oxidant stream includes air. In an aspect, forming the product stream includes contacting the ammonia production mixture in a process under conditions sufficient to form ammonia.

An embodiment described herein provides a system for producing ammonia. The system includes an electrolyzer configured to electrolyze water to form a first electrolysis stream including $H_2$ and a second electrolysis stream including $O_2$, and a reformer configured to contact a reformer feed stream including hydrocarbons, at least a portion of the second electrolysis stream including $O_2$, and an oxidant stream including $O_2$ and $N_2$ under conditions suitable to form a reformed stream including $H_2$, CO, $CO_2$, and $N_2$. The system includes a water-gas shift reactor configured to contact at least a portion of the reformed stream with a water-gas shift catalyst under conditions suitable to form a shifted stream including $H_2$, $CO_2$, and $N_2$, and a carbon capture unit configured to separate at least a portion of the shifted stream to form a captured stream including $CO_2$ and an ammonia production feed stream including $H_2$ and $N_2$. The system includes an ammonia production unit configured to react at least a portion of the ammonia production feed stream including $H_2$ and $N_2$, and optionally at least a portion of the first electrolysis stream including $H_2$, to form a product stream including ammonia.

In an aspect, the system further includes an $O_2$ liquefaction unit configured to liquefy at least a portion of the second electrolysis stream including $O_2$ to form liquid $O_2$, an $O_2$ storage facility configured to store the liquid $O_2$, and an $O_2$ gasification unit configured to gasify at least a portion of the liquid $O_2$ and provide the gasified $O_2$ to the reformer. In an aspect, the system is configured to maintain a rate of formation of the product stream that is at least 50% of a maximum rate of formation of the product stream corresponding to a maximum rate of formation of the first electrolysis stream, by adjusting a ratio of an amount of the gasified $O_2$ contacted in the reformer, an amount of the oxidant stream contacted in the reformer, and an amount of the reformer feed stream contacted in the reformer, to maintain a rate of formation of the product stream that is at least 50% of a maximum rate of formation of the product stream corresponding to a maximum rate of formation of the first electrolysis stream. In an aspect, the system is configured to maintain a molar ratio of a total amount of $H_2$ present in the first electrolysis stream and $H_2$ present in the shifted stream to a total amount of $N_2$ present in the reformed stream that is at least about 2.5.

In an aspect, the system further includes a power plant configured to combust an oxy-fuel combustion mixture including a portion of the second electrolysis stream including $O_2$, and a fuel feed stream including a combustible fuel to produce thermal energy, convert at least a portion of the thermal energy to electrical energy, and capture at least a portion of $CO_2$ formed by combusting the oxy-fuel combustion mixture. In an aspect, the system further includes a power plant configured to combust an oxy-fuel combustion mixture including a portion of the second electrolysis stream including $O_2$, a fuel feed stream including a combustible fuel, and a compressed $CO_2$ stream including supercritical $CO_2$ to form a high-pressure exhaust, expand the high-pressure exhaust to produce electrical energy, and compress at least a portion of the expanded exhaust to form the compressed $CO_2$ stream. In an aspect, the system further includes a CO separation unit configured to separate a portion of the reformed stream including CO to form the fuel feed stream.

In an aspect, the system further includes a pre-reformer configured to contact a partial-reformer feed stream including hydrocarbons, and steam with a partial-reforming catalyst under conditions suitable to form the reformer feed stream, wherein an average hydrocarbon chain length of the partial-reformer feed stream is greater than an average hydrocarbon chain length of the reformer feed stream. In an aspect, the system further includes a purification unit configured to contact a purification feed stream including hydrocarbons and one or more sulfur-containing compounds, and at least a portion of the first electrolysis stream including $H_2$ with a hydro-desulfurization catalyst under conditions suitable to form the partial-reformer feed stream, wherein an amount of sulfur-containing compounds present in the purification feed stream is greater than an amount of sulfur-containing compounds present in the partial-reformer feed stream. In an aspect, the electrolyzer is a membrane-less electrolyzer.

An embodiment described herein provides a method for producing ammonia using a system including an electrolyzer configured to electrolyze water to form a first electrolysis stream including $H_2$ and a second electrolysis stream including $O_2$, a reformer configured to contact a reformer feed stream including hydrocarbons, at least a portion of the second electrolysis stream including $O_2$, and an oxidant stream including $O_2$ and $N_2$ under conditions suitable to form a reformed stream including $H_2$, CO, $CO_2$, and $N_2$, a water-gas shift reactor configured to contact at least a portion of the reformed stream with a water-gas shift catalyst under conditions suitable to form a shifted stream including $H_2$, $CO_2$, and $N_2$, a carbon capture unit configured to separate at least a portion of the shifted stream to form a captured stream including $CO_2$ and an ammonia production feed stream including $H_2$ and $N_2$, an ammonia production unit configured to react at least a portion of the ammonia production feed stream including $H_2$ and $N_2$, and optionally at least a portion of the first electrolysis stream including $H_2$, to form a product stream including ammonia, an $O_2$ liquefaction unit configured to liquefy at least a portion of the second electrolysis stream including $O_2$ to form liquid $O_2$, an $O_2$ storage facility configured to store the liquid $O_2$, and an $O_2$ gasification unit configured to gasify at least a portion of the liquid $O_2$ and provide the gasified $O_2$ to the reformer. The method includes detecting a decreased amount of the first electrolysis stream formed by the electrolyzer, and then increasing an amount of the reformer feed stream contacted in the reformer, relative to an amount of the oxidant stream contacted in the reformer, and increasing an amount of the gasified $O_2$ contacted in the reformer, relative to an amount of the oxidant stream contacted in the reformer. After increasing the amount of the contacted reformer feed stream and the contacted gasified $O_2$, a molar ratio of a total amount of $H_2$ present in the first electrolysis stream and $H_2$ present in the shifted stream to a total amount of $N_2$ present in the reformed stream is at least about 2.5, and a rate of formation of the product stream is at least 50% of a maximum rate of formation of the product stream corresponding to a maximum rate of formation of the first electrolysis stream.

Other implementations are also within the scope of the following claims.

What is claimed is:

1. A method for producing ammonia using a system comprising:
    an electrolyzer configured to electrolyze water to form a first electrolysis stream comprising $H_2$ and a second electrolysis stream comprising $O_2$;
    a reformer configured to contact a reformer feed stream comprising hydrocarbons, at least a portion of the second electrolysis stream comprising $O_2$, and an oxidant stream comprising $O_2$ and $N_2$ under conditions suitable to form a reformed stream comprising $H_2$, CO, $CO_2$, and $N_2$;
    a water-gas shift reactor configured to contact at least a portion of the reformed stream with a water-gas shift catalyst under conditions suitable to form a shifted stream comprising $H_2$, $CO_2$, and $N_2$;
    a carbon capture unit configured to separate at least a portion of the shifted stream to form a captured stream comprising $CO_2$ and an ammonia production feed stream comprising $H_2$ and $N_2$;
    an ammonia production unit configured to react at least a portion of the ammonia production feed stream comprising $H_2$ and $N_2$, and optionally at least a portion of the first electrolysis stream comprising $H_2$, to form a product stream comprising ammonia;

an $O_2$ liquefaction unit configured to liquefy at least a portion of the second electrolysis stream comprising $O_2$ to form liquid $O_2$;

an $O_2$ storage facility configured to store the liquid $O_2$; and an $O_2$ gasification unit configured to gasify at least a portion of the liquid $O_2$ and provide the gasified $O_2$ to the reformer;

the method comprising:

detecting a decreased amount of the first electrolysis stream formed by the electrolyzer; and then increasing an amount of the reformer feed stream contacted in the reformer, relative to an amount of the oxidant stream contacted in the reformer; and increasing an amount of the gasified $O_2$ contacted in the reformer, relative to an amount of the oxidant stream contacted in the reformer;

wherein, after increasing the amount of the contacted reformer feed stream and the contacted gasified $O_2$:

a molar ratio of a total amount of $H_2$ present in the first electrolysis stream and $H_2$ present in the shifted stream to a total amount of $N_2$ present in the reformed stream is at least about 2.5; and a rate of formation of the product stream is at least 50% of a maximum rate of formation of the product stream corresponding to a maximum rate of formation of the first electrolysis stream.

* * * * *